United States Patent
Kaneko et al.

(10) Patent No.: US 9,978,414 B1
(45) Date of Patent: May 22, 2018

(54) MAGNETIC TAPE DEVICE AND HEAD TRACKING SERVO METHOD

(71) Applicant: FUJIFILM Corporation, Tokyo (JP)

(72) Inventors: Tetsuya Kaneko, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/854,474

(22) Filed: Dec. 26, 2017

(30) Foreign Application Priority Data

Dec. 27, 2016 (JP) ................. 2016-254441

(51) Int. Cl.
| | | |
|---|---|---|
| G11B 5/706 | (2006.01) | |
| G11B 5/39 | (2006.01) | |
| G11B 5/68 | (2006.01) | |
| G11B 5/84 | (2006.01) | |

(52) U.S. Cl.
CPC ........ G11B 5/70678 (2013.01); G11B 5/3909 (2013.01); G11B 5/68 (2013.01); G11B 5/706 (2013.01); G11B 5/84 (2013.01)

(58) Field of Classification Search
CPC ............... G11B 2005/001–2005/0018; G11B 2005/3996; G11B 5/00813–5/00826; G11B 5/29–5/3116; G11B 5/39–5/3993; G11B 5/62; G11B 5/68–5/738; G11B 5/84–5/858; G11B 2220/95–2220/956
USPC ............................. 360/55, 69, 75, 77.12, 134
See application file for complete search history.

(56) References Cited

U.S. PATENT DOCUMENTS

| | | | |
|---|---|---|---|
| 6,791,803 B2 * | 9/2004 | Saito ................. | G11B 5/70678 360/55 |
| 7,014,927 B2 * | 3/2006 | Sueki ................. | G11B 5/70 428/842 |
| 7,515,383 B2 * | 4/2009 | Saito ................. | G11B 5/70678 360/131 |
| 2004/0213948 A1 * | 10/2004 | Saito ................. | G11B 5/70678 428/842.8 |
| 2005/0264935 A1 * | 12/2005 | Sueki ................. | G11B 5/70 360/134 |

FOREIGN PATENT DOCUMENTS

JP 2004-185676 A 7/2004

\* cited by examiner

*Primary Examiner* — Wayne Young
*Assistant Examiner* — James L Habermehl
(74) *Attorney, Agent, or Firm* — Sughrue Mion, PLLC

(57) ABSTRACT

The magnetic tape device includes: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic hexagonal ferrite powder, non-magnetic powder, and a binding agent on the non-magnetic support, the magnetic layer includes a servo pattern, and a tilt cos θ of the ferromagnetic hexagonal ferrite powder with respect to a surface of the magnetic layer acquired by cross section observation performed by using a scanning transmission electron microscope is 0.85 to 0.95.

12 Claims, 2 Drawing Sheets

MAGNETIC TAPE DEVICE AND HEAD TRACKING SERVO METHOD

CROSS-REFERENCE TO RELATED APPLICATIONS

This application claims priority under 35 U.S.C 119 to Japanese Patent Application No. 2016-254441 filed on Dec. 27, 2016. The above application is hereby expressly incorporated by reference, in its entirety, into the present application.

BACKGROUND OF THE INVENTION

1. Field of the Invention

The present invention relates to a magnetic tape device and a head tracking servo method.

2. Description of the Related Art

Magnetic recording is used as a method of recording information in a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head as a reproducing head for reproducing information in the magnetic disk device. On the other hand, the usage of the TMR head as a reproducing head in the magnetic tape device is currently still in a stage where the future usage thereof is expected, and the usage thereof is not yet practically realized.

However, in the magnetic tape, information is normally recorded on a data band of the magnetic tape. Accordingly, data tracks are formed in the data band. As means for realizing high capacity of the magnetic tape, a technology of disposing the larger amount of data tracks in a width direction of the magnetic tape by narrowing the width of the data track to increase recording density is used. However, in a case where the width of the data track is narrowed and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer and performing head tracking servo has been recently proposed and practically used. In a magnetic servo type head tracking servo among head tracking servos, a servo pattern is formed in a magnetic layer of a magnetic tape, and this servo pattern is read by a servo head to perform head tracking servo. The head tracking servo is to control a position of a magnetic head in the magnetic tape device. The head tracking servo is more specifically performed as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure signal-to-noise-ratio (SNR) at the time of reading the servo pattern. As a magnetic head, for this, the inventors focused on a TMR head which has been proposed to be used as a reproducing head in the magnetic disk device in JP2004-185676A. As described above, the usage of the TMR head in the magnetic tape device is still in a stage where the future use thereof as a reproducing head for reproducing information is expected, and the usage of the TMR head as the servo head has not even proposed yet. However, the inventors have thought that, it is possible to deal with realization of higher sensitivity of the future magnetic tape, in a case where the TMR head is used as the servo head in the magnetic tape device which performs the head tracking servo.

That is, an object of one aspect of the invention is to provide a magnetic tape device in which a TMR head is mounted as a servo head.

A magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. In a case where the TMR head is used as the servo head, the TMR head detects a change in leakage magnetic field generated from a magnetic layer in which the servo pattern is formed, as a change in resistance value (electric resistance) and reads the servo pattern (reproduces a servo signal) by converting the change in resistance value into a change in voltage. It is said that a resistance value of the TMR head is generally high, as disclosed in a paragraph 0007 of JP2004-185676A, but occurrence of a significant decrease in resistance value in the TMR head may cause a decrease in sensitivity of the TMR head, thereby resulting in a decrease in signal intensity of a servo signal reproduced by the servo head and a decrease in SNR accompanied with that. Accordingly, the accuracy of the head position controlling of the head tracking servo may decrease.

During intensive studies for achieving the object described above, the inventors have found a phenomenon which was not known in the related art, in that, in a case of using the TMR head as a servo head in the magnetic tape device which performs the head tracking servo, a significant decrease in resistance value (electric resistance) occurs in the TMR head. A decrease in resistance value of the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of using the TMR head was not even confirmed in the related art. A difference in the recording and reproducing system between the magnetic disk device and the magnetic tape device, specifically, contact and non-contact between a magnetic recording medium and a magnetic head may be the reason why a significant decrease in resistance value of the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads.

With respect to this, as a result of more intensive studies after finding the phenomenon described above, the inventors have newly found the following points.

It is desired that the magnetic tape is transported at a low speed in the magnetic tape device, in order to prevent a deterioration in recording and reproducing characteristics. But, in a case where the magnetic tape is transported at a low speed which is equal to or lower than a predetermined speed in the magnetic tape device (specifically, in a case where a magnetic tape transportation speed is equal to or lower than 18 m/sec), a decrease in resistance value of the TMR head which reads a servo pattern for performing head tracking servo at the time of recording and/or reproduction of information particularly significantly occurs.

However, such a decrease in resistance value can be prevented by using a magnetic tape described below as the magnetic tape.

One aspect of the invention has been completed based on the finding described above.

That is, according to one aspect of the invention, there is provided a magnetic tape device comprising: a magnetic tape; and a servo head, in which a magnetic tape transportation speed of the magnetic tape device is equal to or lower than 18 m/sec, the servo head is a magnetic head (hereinafter, also referred to as a "TMR head") including a tunnel magnetoresistance effect type element (hereinafter, also referred to as a "TMR element") as a servo pattern reading element, the magnetic tape includes a non-magnetic support, and a magnetic layer including ferromagnetic hexagonal ferrite powder, non-magnetic powder, and a binding agent on the non-magnetic support, the magnetic layer includes a servo pattern, and a tilt $\cos \theta$ (hereinafter, also simply referred to as "$\cos \theta$") of the ferromagnetic hexagonal ferrite powder with respect to a surface of the magnetic layer acquired by cross section observation performed by using a scanning transmission electron microscope is 0.85 to 0.95.

According to another aspect of the invention, there is provided a head tracking servo method comprising: reading a servo pattern of a magnetic layer of a magnetic tape by a servo head in a magnetic tape device, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic hexagonal ferrite powder, non-magnetic powder, and a binding agent on the non-magnetic support, the magnetic layer includes the servo pattern, and a tilt cos θ (hereinafter, also simply referred to as "cos θ") of the ferromagnetic hexagonal ferrite powder with respect to a surface of the magnetic layer acquired by cross section observation performed by using a scanning transmission electron microscope is 0.85 to 0.95.

One aspect of the magnetic tape device and the head tracking servo method is as follows.

In one aspect, the cos θ is 0.87 to 0.95.

In one aspect, a center line average surface roughness Ra measured regarding a surface of the magnetic layer is equal to or smaller than 2.8 nm.

In one aspect, the center line average surface roughness Ra is equal to or smaller than 2.5 nm.

In one aspect, the magnetic tape includes a non-magnetic layer including non-magnetic powder and a binding agent between the non-magnetic support and the magnetic layer, and a total thickness of the magnetic layer and the non-magnetic layer is equal to or smaller than 1.8 μm.

In one aspect, the total thickness of the magnetic layer and the non-magnetic layer is equal to or smaller than 1.1 μm.

According to one aspect of the invention, it is possible to prevent occurrence of a significant decrease in resistance value in the TMR head, in a case of reading a servo pattern of the magnetic layer of the magnetic tape which is transported at the magnetic tape transportation speed equal to or lower than 18 m/sec, by the TMR head.

DESCRIPTION OF THE PREFERRED EMBODIMENTS

Magnetic Tape Device

Figure 1:
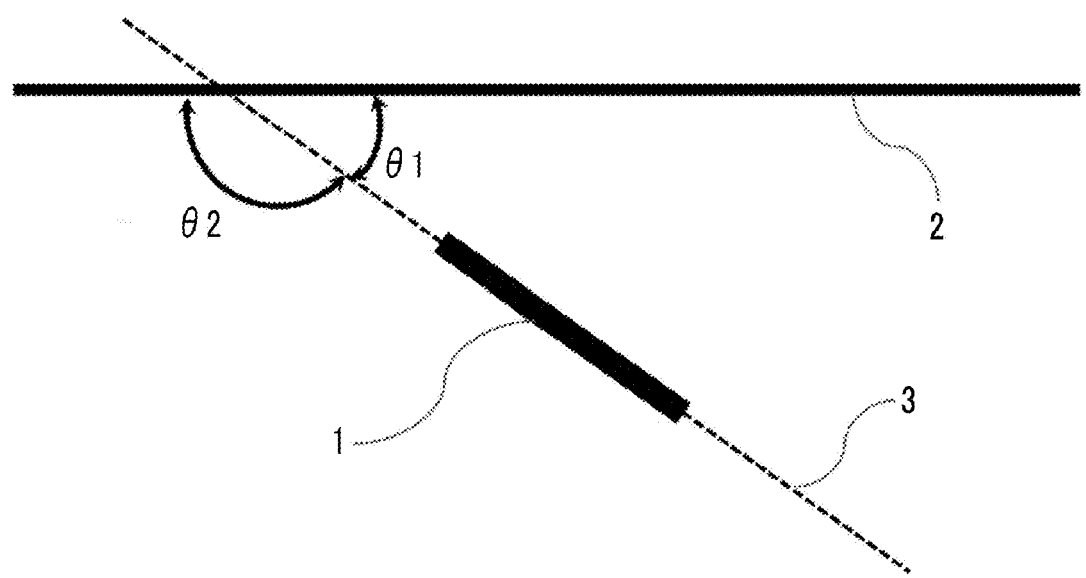
FIG. 1 is an explanatory diagram of an angle θ regarding a cos θ.

One aspect of the invention relates to a magnetic tape device including: a magnetic tape; and a servo head, in which a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic hexagonal ferrite powder, non-magnetic powder, and a binding agent on the non-magnetic support, the magnetic layer includes a servo pattern, and a tilt cos θ (hereinafter, also simply referred to as "cos θ") of the ferromagnetic hexagonal ferrite powder with respect to a surface of the magnetic layer acquired by cross section observation performed by using a scanning transmission electron microscope is 0.85 to 0.95.

In the invention and the specification, the "ferromagnetic hexagonal ferrite powder" means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles". The "aggregate" not only includes an aspect in which particles configuring the aggregate directly come into contact with each other, but also includes an aspect in which a binding agent, an additive, or the like is interposed between the particles.

The points described above are also applied to various powders such as non-magnetic powder of the invention and the specification, in the same manner.

Hereinafter, the magnetic tape device will be described more specifically. A "decrease in resistance value of the TMR head" described below is a significant decrease in resistance value of the TMR head occurring in a case of reading a servo pattern by using the TMR head as the servo head, in the magnetic tape device having the magnetic tape transportation speed equal to or lower than 18 m/sec, unless otherwise noted. The following description contains surmise of the inventors. The invention is not limited by such surmise.

In addition, hereinafter, the examples are described with reference to the drawings. However, the invention is not limited to such exemplified aspects.

Magnetic Tape

Cos θ

Calculation Method of Cos θ

The cos θ is acquired by the cross section observation performed by using a scanning transmission electron microscope (STEM). The cos θ of the invention and the specification is a value measured and calculated by the following method. In the invention and the specification, the "surface of the magnetic layer" of the magnetic tape is identical to the surface of the magnetic tape on the magnetic layer side.

(1) A cross section observation sample is manufactured by performing the cutting out from an arbitrarily determined position of the magnetic tape which is a target for acquiring the cos θ. The manufacturing of the cross section observation sample is performed by focused ion beam (FIB) processing using a gallium ion (Ga$^+$) beam. A specific example of such a manufacturing method is shown in an example which will be described later.

(2) The manufactured cross section observation sample is observed with the STEM, and a STEM images are captured. The STEM images are captured at positions of the same cross section observation sample arbitrarily selected, except for selecting so that the imaging ranges are not overlapped, and total 10 images are obtained. The STEM image is a STEM-high-angle annular dark field (HAADF) image which is captured at an acceleration voltage of 300 kV and a magnification ratio of imaging of 450,000, and the imaging is performed so that entire region of the magnetic layer in a thickness direction is included in one image. The entire region of the magnetic layer in the thickness direction is a region from the surface of the magnetic layer observed in the cross section observation sample to an interface between a layer adjacent to the magnetic layer or the non-magnetic support adjacent to the magnetic layer. The adjacent layer is a non-magnetic layer, in a case where the magnetic tape which is a target for acquiring the cos θ includes the non-magnetic layer which will be described later between the magnetic layer and the non-magnetic support. Meanwhile, in a case where the magnetic tape which is a target for acquiring the cos θ includes the magnetic layer directly on the surface of the non-magnetic support, the interface is an interface between the magnetic layer and the non-magnetic support.

(3) In each STEM image obtained as described above, a linear line connecting both ends of a line segment showing the surface of the magnetic layer is determined as a reference line. In a case where the STEM image is captured so that the magnetic layer side of the cross section observation sample is positioned on the upper side of the image and the non-magnetic support side is positioned on the lower side, for example, the linear line connecting both ends of the line segment described above is a linear line connecting an intersection between a left side of the image (normally, having a rectangular or square shape) of the STEM image and the line segment, and an intersection between a right side of the STEM image and the line segment to each other.

(4) Among the hexagonal ferrite particles observed in the STEM image, an angle θ formed by the reference line and the long axis direction of the hexagonal ferrite particles (primary particles) having an aspect ratio in a range of 1.5 to 6.0 and a length in the long axis direction equal to or greater than 10 nm is measured, and regarding the measured angle θ, the cos θ is calculated as a cos θ based on a unit circle. The calculation of the cos θ is performed with 30 particles arbitrarily extracted from the hexagonal ferrite particles having the aspect ratio and the length in the long axis direction in each STEM image.

(5) The measurement and the calculation are respectively performed for 10 images, the values of the acquired cos θ of the 30 hexagonal ferrite particles of each image, that is, 300 hexagonal ferrite particles in total of the 10 images, are averaged. The arithmetical mean acquired as described above is set as the tilt cos θ of the ferromagnetic hexagonal ferrite powder with respect to the surface of the magnetic layer acquired by the cross section observation performed by using the scanning transmission electron microscope.

Here, the "aspect ratio" observed in the STEM image is a ratio of "length in the long axis direction/length in a short axis direction" of the hexagonal ferrite particles.

The "long axis direction" means a direction in a case where an end portion close to the reference line and an end portion far from the reference line are connected to each other, among the end portions which are most separated from each other, in the image of one hexagonal ferrite particle observed in the STEM image. In a case where a line segment connecting one end portion and the other end portion is parallel with the reference line, a direction parallel to the reference line becomes the long axis direction.

The "length in the long axis direction" means a length of a line segment drawn by connecting end portions which are most separated from each other, in the image of one hexagonal ferrite particle observed in the STEM image. Meanwhile, the "length in the short axis direction" means a length of the longest line segment, among the line segments connecting two intersections between an outer periphery of the image of the particle and a perpendicular line with respect to the long axis direction.

In addition, the angle θ formed by the reference line and the tilt of the particle in the long axis direction is determined to be in a range of 0° to 90°, by setting an angle of the long axis direction parallel to the reference line as 0°. Hereinafter, the angle θ will be further described with reference to the drawings.

Figure 2:
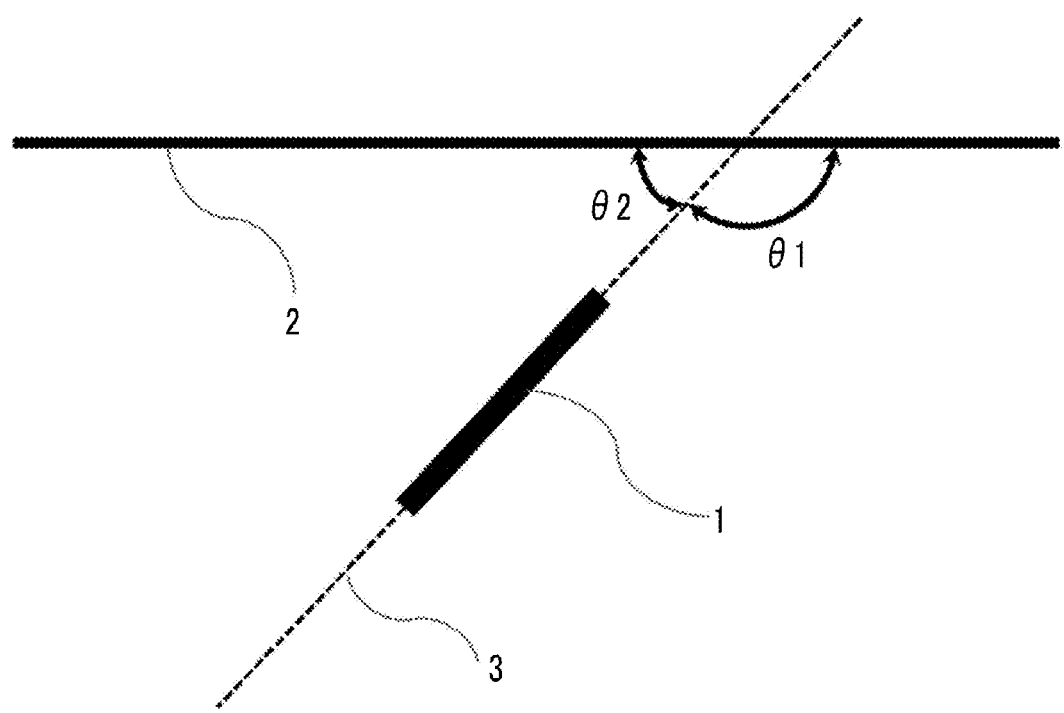
FIG. 2 is an explanatory diagram of the angle θ regarding a cos θ.

FIG. 1 and FIG. 2 are explanatory diagrams of the angle θ. In FIG. 1 and FIG. 2, a reference numeral 1 indicates a line segment (length in the long axis direction) drawn by connecting end portions which are most separated from each other, a reference numeral 2 indicates the reference line, and a reference numeral 3 indicates an extended line of the line segment (reference numeral 1). In this case, as the angle formed by the reference line 2 and the extended line 3, θ1 and θ2 are exemplified as shown in FIG. 1 and FIG. 2. Here, a smaller angle is used from the θ1 and θ2, and this is set as the angle θ. Accordingly, in the aspect shown in FIG. 1, the θ1 is set as the angle θ, and in the aspect shown in FIG. 2, θ2 is set as the angle θ. A case where θ1=θ2 is a case where the angle θ=90°. The cos θ based on the unit circle becomes 1.00, in a case where the θ=0°, and becomes 0, in a case where the θ=90°.

The magnetic tape includes the ferromagnetic hexagonal ferrite powder and the non-magnetic powder in the magnetic layer, and cos θ is 0.85 to 0.95. The inventors have thought that hexagonal ferrite particles satisfying the aspect ratio and the length in the long axis direction among the hexagonal ferrite particles configuring the ferromagnetic hexagonal ferrite powder included in the magnetic layer can support the non-magnetic powder. The inventors have thought that this point contributes to the prevention of a decrease in resistance value of the TMR head by using the magnetic tape. This point will be further described below.

The magnetic tape transportation speed of the magnetic tape device is also referred to as a running speed. In the invention and the specification, the "magnetic tape transportation speed" is a relative speed between the magnetic tape transported in the magnetic tape device and the servo head in a case where the servo pattern is read by the servo head. In the magnetic tape device, in a case of using a magnetic tape of the related art, in a case where the TMR head is used as the servo head and the magnetic tape is transported under specific conditions in which the magnetic tape transportation speed is equal to or lower than 18 m/sec, a phenomenon in which a resistance value (electric resistance) significantly decreases occurs in the TMR head used as the servo head. This phenomenon is a phenomenon that is newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reading a servo pattern formed in the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reading a servo pattern formed in the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurring even at one portion between the two electrodes as described above is a phenomenon which does not occur in other MR heads. In the magnetic disk device using a levitation type recording and reproducing system, a magnetic disk and a magnetic head do not come into contact with each other, and thus, damage causing short circuit hardly occurs. On the other hand, in the magnetic tape device using a sliding type recording and reproducing system, the magnetic tape and the servo head come into contact with each other and slide on each other, in a case of reading a servo pattern by the servo head. Accordingly, in a case where any measures are not prepared, the TMR head is affected and damaged due to the sliding between the TMR head and the magnetic tape, and thus, short circuit easily occurs. Among these, in a case where the transportation speed of the magnetic tape is low, the time for which the same portion of the TMR head comes into contact with the magnetic tape increases at the time of reading a servo pattern by the TMR head, and accordingly, damage more easily occurs. The inventors have assumed that this is the reason why a decrease in resistance value of the TMR head particularly significantly occurs in a case of using the TMR head as the servo head in the magnetic tape device in which the magnetic tape transportation speed is equal to or lower than 18 m/sec.

With respect to this, as a result of intensive studies of the inventors, the inventors have newly found that it is possible to prevent a phenomenon in which a decrease in resistance value of the TMR head occurs particularly significantly in the magnetic tape device in which the magnetic tape transportation speed is equal to or lower than 18 m/sec, by using the magnetic tape which includes the magnetic layer including ferromagnetic hexagonal ferrite powder, non-magnetic powder, and a binding agent on the non-magnetic support, and in which the cos $\theta$ is 0.85 to 0.95. This point will be further described below.

The magnetic tape includes the ferromagnetic hexagonal ferrite powder and the non-magnetic powder in the magnetic layer, and the cos $\theta$ is 0.85 to 0.95. The inventors have thought that the non-magnetic powder included in the magnetic layer is protruded to the surface of the magnetic layer and contributes to a decrease in real contact area of the surface of the magnetic layer and the TMR head in a case of reading a servo pattern. However, the inventors have considered that, in a case where there are no measures, particles of the non-magnetic powder present in the vicinity of the surface of the magnetic layer are embedded in the magnetic layer due to a force applied due to the contact with the TMR head. Accordingly, the inventors have surmised that the TMR head is easily affected by the contact with the magnetic tape, due to a disturbance of smooth sliding between the magnetic tape and the TMR head (that is, a decrease in sliding properties) due to an increase in real contact area of the surface of the magnetic layer and the TMR head.

With respect to this, the inventors have considered that hexagonal ferrite particles satisfying the aspect ratio and the length in the long axis direction in the ranges described above, among the ferromagnetic hexagonal ferrite powder included in the magnetic layer can support the non-magnetic powder. The inventors have thought that, in a case where such hexagonal ferrite particles are present in the magnetic layer in a state where the cos $\theta$ is equal to or greater than 0.85, it is possible to prevent the embedding of the particles of the non-magnetic powder present in the vicinity of the surface of the magnetic layer in the magnetic layer and this causes smooth sliding between the magnetic tape and the TMR head. As a result, the inventors have surmised that it is possible to prevent a decrease in resistance value of the TMR head. The cos $\theta$ is preferably equal to or greater than 0.87 and more preferably equal to or greater than 0.90, from a viewpoint of further preventing a decrease in resistance value of the TMR head. In addition, as a result of the studies of the inventors, the inventors have determined that the cos $\theta$ equal to or smaller than 0.95 contributes to the prevention of a decrease in resistance value of the TMR head. However, the reason thereof is not clear. The inventors have surmised that, the hexagonal ferrite particles satisfying the aspect ratio and the length in the long axis direction in the ranges described above support the support of a small amount of coarse foreign materials mixed in the magnetic tape without any intention, and as a result, the TMR head is affected and damaged due to the coarse foreign materials. However, this is merely the surmise.

A squareness ratio is known as an index for the presence state (orientation state) of the ferromagnetic hexagonal ferrite powder of the magnetic layer. However, according to the studies of the inventors, an excellent correlation was not observed between the squareness ratio and a degree of prevention of a decrease in resistance value of the TMR head. The squareness ratio is a value indicating a ratio of residual magnetization with respect to saturated magnetization, and is measured using all of the hexagonal ferrite particles as targets, regardless of the shapes and size of the hexagonal ferrite particles included in the ferromagnetic hexagonal ferrite powder. With respect to this, the cos $\theta$ is a value measured by selecting the hexagonal ferrite particles having the aspect ratio and the length in the long axis direction in the ranges described above. The inventors have thought that, due to such a difference between the cos $\theta$ and the squareness ratio, an excellent correlation between the squareness ratio and a degree of prevention of a decrease in resistance value of the TMR head is not observed, but a decrease in resistance value of the TMR head may be prevented by controlling the cos $\theta$.

However, the above descriptions are merely a surmise of the inventors and the invention is not limited thereto.

Regarding the cos $\theta$, JP2016-177851A discloses that the cos $\theta$ is set to be in a specific range, in order to prevent a deterioration in abrasion resistance of the surface of the magnetic layer due to repeated running, in the magnetic tape including the magnetic layer including ferromagnetic hexagonal ferrite powder having an activation volume in a specific range. However, as described above, the usage of the TMR head as a servo head in the magnetic tape device is not even proposed in the related art. In addition, in the magnetic tape device in which the TMR head is mounted as a servo head, the occurrence of a particularly significant decrease in resistance value of the TMR head at a specific magnetic tape transportation speed (specifically, equal to or lower than 18 m/sec) is a phenomenon which was not known in the related art. With respect to such a phenomenon, the effect of the cos $\theta$ and a possibility of prevention of the phenomenon by setting the cos $\theta$ to be 0.85 to 0.95 is not disclosed in JP2016-177851A and is newly found by the inventors as a result of intensive studies.

Adjustment Method of Cos θ

The magnetic tape can be manufactured through a step of applying a magnetic layer forming composition onto the surface of the non-magnetic support directly or with another layer interposed therebetween. As an adjustment method of the cos θ, a method of controlling a dispersion state of the ferromagnetic hexagonal ferrite powder of the magnetic layer forming composition is used. The inventors have thought that, as dispersibility of the ferromagnetic hexagonal ferrite powder in the magnetic layer forming composition (hereinafter, also simply referred to as "dispersibility of the ferromagnetic hexagonal ferrite powder" or "dispersibility") is increased, the hexagonal ferrite particles having the aspect ratio and the length in the long axis direction in the ranges described above in the magnetic layer formed by using this magnetic layer forming composition are easily oriented in a state closer to parallel to the surface of the magnetic layer. As means for increasing dispersibility, any one or both of the following methods (1) and (2) are used.

(1) Adjustment of Dispersion Conditions
(2) Use of Dispersing Agent

In addition, as means for increasing dispersibility, a method of separately dispersing the ferromagnetic hexagonal ferrite powder and at least one of the non-magnetic powder is also used. As one aspect of the non-magnetic powder, an abrasive can be used as will be described later in detail. The separate dispersing preferably includes preparing the magnetic layer forming composition through a step of mixing a magnetic solution including the ferromagnetic hexagonal ferrite powder, a binding agent, and a solvent (here, substantially not including an abrasive), and an abrasive liquid including an abrasive and a solvent with each other. By performing the mixing after separately dispersing the abrasive and the ferromagnetic hexagonal ferrite powder as described above, it is possible to increase the dispersibility of the ferromagnetic hexagonal ferrite powder in the magnetic layer forming composition. The expression of "substantially not including an abrasive" means that the abrasive is not added as a constituent component of the magnetic solution, and a small amount of the abrasive present as impurities by being mixed without intention is allowed. In addition, it is also preferable that any one or both of the methods (1) and (2) is combined with the separate dispersion described above. In this case, by controlling the dispersion state of the ferromagnetic hexagonal ferrite powder of the magnetic solution, it is possible to control the dispersion state of the ferromagnetic hexagonal ferrite powder of the magnetic layer forming composition obtained through the step of mixing the magnetic solution with the abrasive liquid.

For the (1) adjustment of dispersion conditions, a description disclosed in a paragraph 0039 of JP2016-177851A can be referred to as.

For the (2) use of dispersing agent, a description disclosed in paragraphs 0040 to 0143 of JP2016-177851A can be referred to as.

Next, the magnetic layer and the like included in the magnetic tape will be described more specifically.

Magnetic Layer

Ferromagnetic Powder

The magnetic layer includes ferromagnetic hexagonal ferrite powder as the ferromagnetic powder. As an index for a particle size of the ferromagnetic hexagonal ferrite powder, an activation volume can be used. The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter in an environment of an atmosphere temperature of 23° C.±1° C., and the activation volume is a value acquired from the following relational expression of Hc and an activation volume V.

$$Hc=2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

It is desired that recording density is increased (high-density recording is realized) in the magnetic tape, in accordance with a great increase in information content of recent years. As a method for achieving high-density recording, a method of decreasing a particle size of ferromagnetic powder included in a magnetic layer and increasing a filling percentage of the ferromagnetic powder of the magnetic layer is used. From this viewpoint, the activation volume of the ferromagnetic hexagonal ferrite powder is preferably equal to or smaller than 2,500 nm³, more preferably equal to or smaller than 2,300 nm³, and even more preferably equal to or smaller than 2,000 nm³. Meanwhile, from a viewpoint of stability of magnetization, the activation volume is, for example, preferably equal to or greater than 800 nm³, more preferably equal to or greater than 1,000 nm³, and even more preferably equal to or greater than 1,200 nm³. A percentage of the hexagonal ferrite particles having the aspect ratio and the length in the long axis direction in the ranges described above in all of the hexagonal ferrite particles observed in the STEM image, can be, for example, equal to or greater than 50%, as a percentage with respect to all of the hexagonal ferrite particles observed in the STEM image, based on the particle number. In addition, the percentage can be, for example, equal to or smaller than 95% and can exceed 95%. For other details of ferromagnetic hexagonal ferrite powder, for example, descriptions disclosed in paragraphs 0012 to 0030 of JP2011-225417A, paragraphs 0134 to 0136 of JP2011-216149A, and paragraphs 0013 to 0030 of JP2012-204726A can be referred to.

The content (filling percentage) of the ferromagnetic hexagonal ferrite powder of the magnetic layer is preferably in a range of 50 to 90 mass % and more preferably in a range of 60 to 90 mass %. The component other than the ferromagnetic hexagonal ferrite powder of the magnetic layer is at least a binding agent and non-magnetic powder, and one or more kinds of additives can be arbitrarily included. A high filling percentage of the ferromagnetic hexagonal ferrite powder of the magnetic layer is preferable, from a viewpoint of improving recording density.

Binding Agent

The magnetic tape is a coating type magnetic tape, and the magnetic layer includes a binding agent together with the ferromagnetic powder and the non-magnetic powder. As the binding agent, one or more kinds of resin is used. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Non-Magnetic Powder

The magnetic layer includes one or two or more kinds of non-magnetic powders. As the non-magnetic powder, an abrasive can be used. As one aspect of the non-magnetic powder, non-magnetic powder which can function as an abrasive (hereinafter, referred to as an "abrasive") can be used. As another aspect of the non-magnetic powder, non-magnetic powder which can function as a projection formation agent which forms projections suitably protruded from the surface of the magnetic layer (hereinafter, referred to as a "projection formation agent") can be used. The projection formation agent is a component which can contribute to the control of friction properties of the surface of the magnetic layer of the magnetic tape. In the magnetic layer of the magnetic tape, at least one of the abrasive or the projection formation agent is preferably included, and both thereof are more preferably included.

The abrasive is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

As the projection formation agent, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

In addition, from a viewpoint that the abrasive and the projection formation agent can exhibit the functions thereof in an excellent manner, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic hexagonal ferrite powder. Meanwhile, the content of the projection formation agent in the magnetic layer is preferably 1.0 to 4.0 parts by mass and more preferably 1.5 to 3.5 parts by mass with respect to 100.0 parts by mass of the ferromagnetic hexagonal ferrite powder.

Other Components

The magnetic layer includes the ferromagnetic hexagonal ferrite powder, the non-magnetic powder, and the binding agent, and may include one or more kinds of additives, if necessary. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a lubricant, a dispersing agent, a dispersing assistant, an antifungal agent, an antistatic agent, an antioxidant, and carbon black. As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic powder such as an abrasive, in order to decrease the center line average surface roughness Ra measured regarding the surface of the magnetic layer.

Center Line Average Surface Roughness Ra Measured Regarding Surface of Magnetic Layer Increasing a surface smoothness of the magnetic layer in the magnetic tape causes improvement of electromagnetic conversion characteristics. Regarding the surface smoothness of the magnetic layer, the center line average surface roughness Ra measured regarding the surface of the magnetic layer can be an index. In the invention and the specification, the center line average surface roughness Ra measured regarding the surface of the magnetic layer of the magnetic tape is a value measured with an atomic force microscope (AFM) in a region having an area of 40 μm×40 μm. As an example of the measurement conditions, the following measurement conditions can be used. The center line average surface roughness Ra shown in examples which will be described later is a value obtained by the measurement under the following measurement conditions.

The measurement is performed regarding the region of 40 μm×40 μm of the area of the surface of the magnetic layer of the magnetic tape with an AFM (Nanoscope 4 manufactured by Veeco Instruments, Inc.). A scan speed (probe movement speed) is set as 40 μm/sec and a resolution is set as 512 pixel×512 pixel.

In one aspect, the center line average surface roughness Ra measured regarding the surface of the magnetic layer of the magnetic tape is preferably equal to or smaller than 2.8 nm, more preferably equal to or smaller than 2.5 nm, even more preferably equal to or smaller than 2.3 nm, and still more preferably equal to or smaller than 2.0 nm, from a viewpoint of improving electromagnetic conversion characteristics. However, according to the studies of the inventors, it is found that, in a case where the center line average surface roughness Ra measured regarding the surface of the magnetic layer is equal to or smaller than 2.5 nm and any measures are not prepared, a decrease in resistance value of the TMR head tends to occur even more significantly. However, even a significant decrease in resistance value of the TMR head occurring in a case where the Ra is equal to or smaller than 2.5 nm can be prevented, in a case of the magnetic tape device according to one aspect of the invention. In addition, the center line average surface roughness Ra measured regarding the surface of the magnetic layer can be equal to or greater than 1.2 nm or equal to or greater than 1.3 nm. From a viewpoint of improving electromagnetic conversion characteristics, a low value of the Ra is preferable, and thus, the Ra may be lower than the values described above.

The surface smoothness of the magnetic layer, that is, the center line average surface roughness Ra measured regarding the surface of the magnetic layer can be controlled by a well-known method. For example, the surface smoothness of the magnetic layer can be controlled by adjusting a size of various powder (for example, ferromagnetic powder, non-magnetic powder, and the like) included in the magnetic layer or manufacturing conditions of the magnetic tape.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.0 to 6.0 μm.

A thickness of the magnetic layer is preferably equal to or smaller than 0.15 μm and more preferably equal to or smaller than 0.1 μm, from a viewpoint of realization of high-density recording required in recent years. The thickness of the magnetic layer is even more preferably 0.01 to 0.1 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 μm and is preferably 0.1 to 1.0 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.8 μm, more preferably equal to or smaller than 1.5 μm, and even more preferably equal to or smaller than 1.1 μm, from a viewpoint of thinning the magnetic tape. According to the studies of the inventors, it is found that, in a case where the total thickness of the magnetic layer and the non-magnetic layer is equal to or smaller than 1.1 μm and any measures are not prepared, a decrease in resistance value of the TMR head tends to occur even more significantly. However, even a significant decrease in resistance value of the TMR head occurring in a case where the total thickness of the magnetic layer and the non-magnetic layer is equal to or smaller than 1.1 μm can be prevented, in a case of the magnetic tape device according to one aspect of the invention. In addition, the total thickness of the magnetic layer and the non-magnetic layer can be, for example, equal to or greater than 0.1 μm or equal to or greater than 0.2 μm.

A thickness of the back coating layer is preferably equal to or smaller than 0.9 μm and even more preferably 0.1 to 0.7 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the ferromagnetic hexagonal ferrite powder and the abrasive are separately dispersed as described above. In addition, in order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as a dispersion medium. As such dispersion beads, zirconia beads, titania beads, and steel beads which are dispersion beads having high specific gravity are suitable. The dispersion beads can be used by optimizing a bead diameter and a filling percentage of the dispersion beads. As a dispersing machine, a well-known dispersing machine can be used. As one of means for obtaining a magnetic tape having cos θ of 0.85 to 0.95, a technology of reinforcing the dispersion conditions (for example, increasing the dispersion time, decreasing the diameter of the dispersion beads used for dispersion and/or increasing the filling percentage of the dispersion beads, using the dispersing agent, and the like) is also preferable. For the details of other manufacturing method of a magnetic tape, descriptions disclosed in paragraphs 0051 to 0057 of JP2010-24113A can be referred to, for example. For the orientation process, a description disclosed in a paragraph 0052 of JP2010-24113A can be referred to. As one of means for obtaining a magnetic tape having cos θ of 0.85 to 0.95, a homeotropic alignment process is preferably performed.

Formation of Servo Pattern

A servo pattern is formed in the magnetic layer by magnetizing a specific position of the magnetic layer with a servo pattern recording head (also referred to as a "servo write head"). A well-known technology regarding a servo pattern of the magnetic layer of the magnetic tape which is well known can be applied for the shapes of the servo pattern with which the head tracking servo can be performed and the disposition thereof in the magnetic layer. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals) to the magnetic tape, the magnetic tape is drawn from the magnetic tape cartridge and wound around the reel on the drive side. A servo head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the servo head comes into contact with and slides on the surface of the magnetic layer of the magnetic tape, and accordingly, the reading of the servo pattern is performed by the servo head. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Servo Head

The magnetic tape device includes the TMR head as the servo head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a servo pattern reading element for reading a servo pattern formed in the magnetic layer of the magnetic tape. By converting the detected change in resistance value into a change in voltage, the servo pattern can be read (servo signal can be reproduced).

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the servo pattern can be read. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in electric resistance causes a decrease in accuracy of the head position controlling of the head tracking servo. This decrease in resistance value of the TMR head can be prevented by using the magnetic tape described above as the magnetic tape in which the magnetic layer includes a servo pattern.

The servo head is a magnetic head including at least the TMR element as a servo pattern reading element. The servo head may include or may not include a reproducing element for reproducing information recorded on the magnetic tape. That is, the servo head and the reproducing head may be one magnetic head or separated magnetic heads. The same applies to a recording element for performing the recording of information in the magnetic tape.

Magnetic Tape Transportation Speed

The magnetic tape transportation speed of the magnetic tape device is equal to or lower than 18 m/sec. Normally, the magnetic tape transportation speed is set in a control unit of the magnetic tape device. It is desired that the magnetic tape is transported at a low speed in the magnetic tape device, in order to prevent a deterioration of recording and reproducing characteristics. But, in a case where the magnetic tape transportation speed is equal to or lower than 18 m/sec in the magnetic tape device including the TMR head as a servo head, a decrease in resistance value of the TMR head used as the servo head occurs particularly significantly. In the magnetic tape device according to one aspect of the invention, such a decrease in resistance value can be prevented by using a magnetic tape having the cos θ of 0.85 to 0.95. The magnetic tape transportation speed is equal to or lower than 18 m/sec or may be equal to or lower than 15 m/sec or equal to or lower than 10 m/sec. The magnetic tape transportation speed can be, for example, equal to or higher than 1 m/sec.

Head Tracking Servo Method

One aspect of the invention relates to a head tracking servo method including: reading a servo pattern of a magnetic layer of a magnetic tape by a servo head in a magnetic tape device, a magnetic tape transportation speed of the magnetic tape device is equal to or lower than 18 m/sec, the servo head is a magnetic head including a tunnel magnetoresistance effect type element as a servo pattern reading element, the magnetic tape includes a non-magnetic support, and a magnetic layer including ferromagnetic hexagonal ferrite powder, non-magnetic powder, and a binding agent on the non-magnetic support, the magnetic layer includes the servo pattern, and a tilt cos θ of the ferromagnetic hexagonal ferrite powder with respect to a surface of the magnetic layer acquired by cross section observation performed by using a scanning transmission electron microscope is 0.85 to 0.95. The reading of the servo pattern is performed by bringing the magnetic tape into contact with the servo head allowing sliding while transporting (causing running of) the magnetic tape. The details of the magnetic tape and the servo head used in the head tracking servo method are as the descriptions regarding the magnetic tape device according to one aspect of the invention.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed in a magnetic layer, and a position of a servo head is recognized by an interval of time in a case where the servo head has read the two servo patterns having different shapes and an interval of time in a case where the servo head has read two servo patterns having the same shapes. The position of the magnetic head of the magnetic tape in the width direction is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 3:
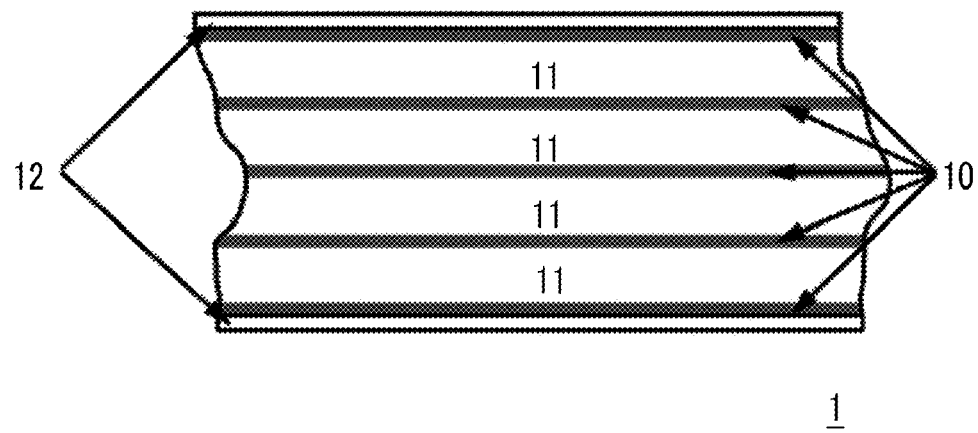
FIG. 3 shows an example of disposition of data bands and servo bands.
Figure 4:
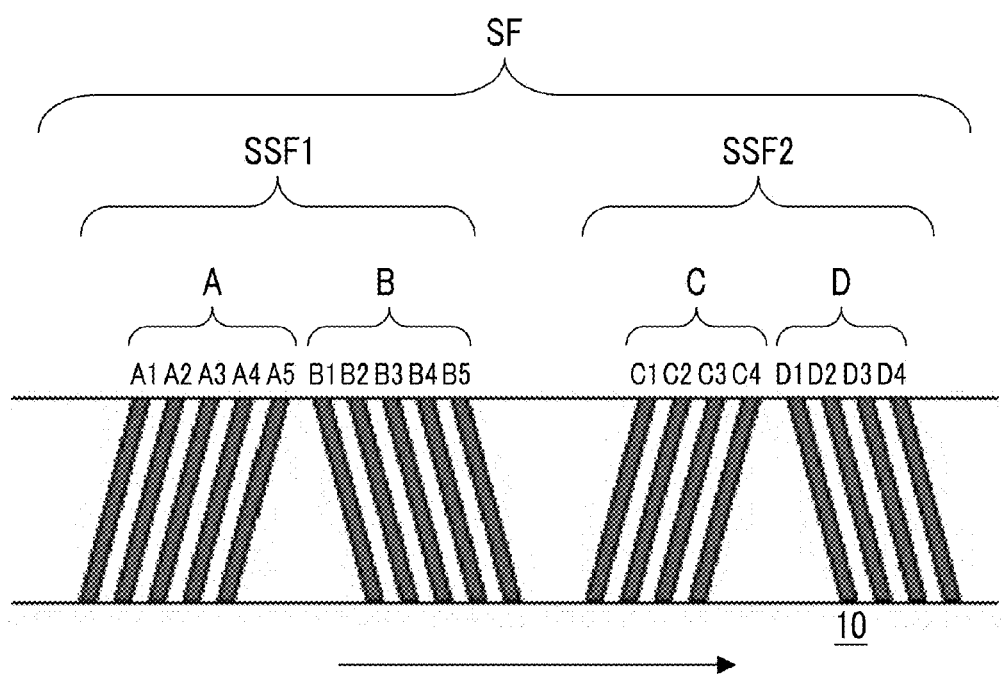
FIG. 4 shows a servo pattern disposition example of a linear-tape-open (LTO) Ultrium format tape.

FIG. 3 shows an example of disposition of data bands and servo bands. In FIG. 3, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 4 are formed on a servo band in a case of manufacturing a magnetic tape. Specifically, in FIG. 4, a servo frame SF on the servo band 10 is configured with a servo sub-frame 1 (SSF1) and a servo sub-frame 2 (SSF2). The servo sub-frame 1 is configured with an A burst (in FIG. 4, reference numeral A) and a B burst (in FIG. 4, reference numeral B). The A burst is configured with servo patterns A1 to A5 and the B burst is configured with servo patterns B1 to B5. Meanwhile, the servo sub-frame 2 is configured with a C burst (in FIG. 4, reference numeral C) and a D burst (in FIG. 4, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 4 shows one servo frame for explaining. However, in practice, in the magnetic layer of the magnetic tape in which the head tracking servo in the timing-based servo system is performed, a plurality of servo frames are disposed in each servo band in a running direction. In FIG. 4, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 4, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 3 and 4, but also to entire timing-based servo systems.

For the details of the head tracking servo in the timing-based servo system, well-known technologies such as technologies disclosed in U.S. Pat. No. 5,689,384A, U.S. Pat. No. 6,542,325B, and U.S. Pat. No. 7,876,521B can be referred to, for example. In addition, for the details of the head tracking servo in the amplitude-based servo system, well-known technologies disclosed in U.S. Pat. No. 5,426,543A and U.S. Pat. No. 5,898,533A can be referred to, for example.

According to one aspect of the invention, a magnetic tape used in a magnetic tape device in which a TMR head is used as a servo head and a magnetic tape transportation speed in a case of reading a servo pattern of a magnetic layer of the magnetic tape is equal to or lower than 18 m/sec, the magnetic tape including: a non-magnetic support, and a magnetic layer including ferromagnetic hexagonal ferrite powder, non-magnetic powder, and a binding agent on the non-magnetic support, in which the magnetic layer includes a servo pattern, and a tilt cos θ of the ferromagnetic hexagonal ferrite powder with respect to a surface of the magnetic layer acquired by cross section observation performed by using a scanning transmission electron microscope is 0.85 to 0.95 is also provided. The details of the magnetic tape are also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

An average particle size of the powder of the invention and the specification is a value measured by a method disclosed in paragraphs 0058 to 0061 of JP2016-071926A. The measurement of the average particle size described below was performed by using transmission electron microscope H-9000 manufactured by Hitachi, Ltd. as the transmission electron microscope, and image analysis software KS-400 manufactured by Carl Zeiss as the image analysis software.

Example 1

1. Manufacturing of Magnetic Tape
(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a SO$_3$Na group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 m$^2$/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic hexagonal barium ferrite powder: 100.0 parts
  Activation volume: 1,800 nm$^3$
SO$_3$Na group-containing polyurethane resin: 14.0 parts
  Weight-average molecular weight: 70,000, SO$_3$Na group: 0.2 meq/g
Dispersing agent: see Table 1
  Type: see Table 1
Cyclohexanone: 150.0 parts
Methyl ethyl ketone: 150.0 parts
Abrasive Liquid
  Alumina dispersion prepared in the section (1): 6.0 parts
Silica Sol (Projection Forming Agent Liquid)
  Colloidal silica: 2.0 parts
  Average particle size: see Table 1
  Methyl ethyl ketone: 1.4 parts
Other Components
  Stearic acid: 2.0 parts
  Butyl stearate: 6.0 parts
  Polyisocyanate (CORONATE (registered trademark) manufactured by Nippon Polyurethane Industry Co., Ltd.): 2.5 parts
Finishing Additive Solvent
  Cyclohexanone: 200.0 parts
  Methyl ethyl ketone: 200.0 parts The activation volume is a value obtained by the following method.

The powder in a powder lot which is the same as that of ferromagnetic hexagonal barium ferrite powder used in the preparation of the magnetic layer forming composition was used as a measurement sample of the activation volume. The magnetic field sweep rates in the Hc measurement part at timing points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C.±1° C.

(3) Non-Magnetic Layer Forming Composition List
Non-magnetic inorganic powder: α-iron oxide: 100.0 parts
  Average particle size (average long axis length): 0.15 μm
  Average acicular ratio: 7
  BET specific surface area: 52 m$^2$/g
Carbon black: 20.0 parts
  Average particle size: 20 nm
SO$_3$Na group-containing polyurethane resin: 18.0 parts
  (Weight-average molecular weight: 70,000, SO$_3$Na group: 0.2 meq/g)
Stearic acid: 1.0 part
Cyclohexanone: 300.0 parts
Methyl ethyl ketone: 300.0 parts
(4) Back Coating Layer Forming Composition List
Non-magnetic inorganic powder: α-iron oxide: 80.0 parts
  Average particle size (average long axis length): 0.15 μm
  Average acicular ratio: 7
  BET specific surface area: 52 m$^2$/g
Carbon black: 20.0 parts
  Average particle size: 20 nm
A vinyl chloride copolymer: 13.0 parts
Sulfonic acid group-containing polyurethane resin: 6.0 parts
Phenylphosphonic acid: 3.0 parts
Stearic acid: 3.0 parts
Butyl stearate: 3.0 parts Polyisocyanate (CORONATE L manufactured by Nippon Polyurethane Industry Co., Ltd.): 5.0 parts Methyl ethyl ketone: 155.0 parts Cyclohexanone: 355.0 parts (5) Preparation of Each Layer Forming Composition (i) Preparation of Magnetic Layer Forming Composition The magnetic layer forming composition was prepared by the following method.

A magnetic solution was prepared by performing beads-dispersing of the magnetic solution components described above by using beads as the dispersion medium in a batch type vertical sand mill. Specifically, the dispersing process was performed for the dispersion time (retention time in a dispersing machine) shown in Table 1 by using zirconia beads having a bead diameter shown in Table 1 as the beads dispersion of each stage (first stage or second stage). In the beads dispersion, dispersion liquid obtained by using a filter (average hole diameter of 5 µm) was filtered after completion of each stage. In the beads dispersion of each stage, the filling percentage of the dispersion medium was set to be approximately 50 to 80 volume %.

The magnetic solution obtained as described above was mixed with the abrasive liquid, silica sol, other components, and the finishing additive solvent and beads-dispersed for 5 minutes by using the sand mill, and ultrasonic dispersion was performed with a batch type ultrasonic device (20 kHz, 300 W) for 0.5 minutes. After that, the obtained mixed liquid was filtered by using a filter (average hole diameter of 0.5 µm), and the magnetic layer forming composition was prepared.

A circumferential speed of a distal end of the sand mill at the time of beads dispersion was in a range of 7 to 15 m/sec.

(ii) Preparation of Non-Magnetic Layer Forming Composition

The non-magnetic layer forming composition was prepared by the following method.

Each component excluding stearic acid, cyclohexanone, and methyl ethyl ketone was beads-dispersed by using a batch type vertical sand mill (dispersion medium: zirconia beads (bead diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (average hole diameter of 0.5 µm), and a non-magnetic layer forming composition was prepared.

(iii) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed liquid was subjected to a dispersing process of 12 passes, with a transverse beads mill by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. Then, the obtained dispersion liquid was filtered with a filter (average hole diameter of 1 µm) and a back coating layer forming composition was prepared.

(6) Manufacturing Method of Magnetic Tape

The non-magnetic layer forming composition prepared in the section (5) (ii) was applied to the surface of a support made of polyethylene naphthalate having a thickness of 5.0 µm so that the thickness after the drying becomes the thickness shown in Table 1 and dried, to form a non-magnetic layer. Then, the magnetic layer forming composition prepared in the section (5) (i) was applied onto the non-magnetic layer so that the thickness after the drying becomes the thickness shown in Table 1, and a coating layer was formed. In Examples and Comparative Examples in which "performed" was shown in the column of the homeotropic alignment process in Table 1, the homeotropic alignment process was performed by applying a magnetic field having a magnetic field strength of 0.3 T to the surface of the coating layer in a vertical direction, while the coating layer of the magnetic layer forming composition was not dried, and then, the drying was performed to form the magnetic layer. In Comparative Examples in which "not performed" was shown in the column of the homeotropic alignment process in Table 1, the coating layer of the magnetic layer forming composition was dried without performing the homeotropic alignment process to form the magnetic layer.

After that, the back coating layer forming composition prepared in the section (5) (iii) was applied to the surface of the support made of polyethylene naphthalate on a side opposite to the surface where the non-magnetic layer and the magnetic layer are formed, so that the thickness after the drying becomes 0.5 µm, and dried.

Then, a surface smoothing treatment (calender process) was performed with a calender roll configured of only a metal roll, at a speed of 100 m/min, linear pressure of 294 kN/m (300 kg/cm), and a calender temperature (surface temperature of a calender roll) shown in Table 1.

Then, a heating process was performed in the environment of the atmosphere temperature of 70° C. for 36 hours. After the heating process, the layer was slit to have a width of ½ inches (0.0127 meters), and a magnetic tape for forming a servo pattern on the magnetic layer was manufactured.

In a state where the magnetic layer of the manufactured magnetic tape was demagnetized, servo patterns having disposition and shapes according to the LTO Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer of the manufactured magnetic tape was acquired by the following method. It was confirmed that the thicknesses of the formed non-magnetic layer and the magnetic layer were the thicknesses shown in Table 1 and the thicknesses of the back coating layer and the non-magnetic support were the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation described below, and the other part was used in order to measure a resistance value of the TMR head which will be described later.

2. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.), and a center line average surface roughness Ra was acquired. A scan speed (probe movement speed) was set as 40 μm/sec and a resolution was set as 512 pixel×512 pixel.

(2) Measurement of Cos θ

A cross section observation sample was cut out from the manufactured magnetic tape and cos θ was acquired by the method described above by using this sample. In each magnetic tape of Example 1 and Examples 2 to 8 and Comparative Examples 1 to 16 which will be described later, a percentage of hexagonal ferrite particles having the aspect ratio and the length in the long axis direction of the ranges described above which is a measurement target of cos θ occupying all of the hexagonal ferrite particles observed in the STEM image, was approximately 80% to 95% based on the particle number.

The cross section observation sample used for the measurement of cos θ was manufactured by the following method.

(i) Manufacturing of Sample Including Protective Film

A sample including a protective film (laminated film of a carbon film and a platinum film) was manufactured by the following method.

A sample having a size of a width direction 10 mm×longitudinal direction 10 mm of the magnetic tape was cut out from the magnetic tape which is a target acquiring the cos θ, with a blade. The width direction of the sample described below is a direction which was a width direction of the magnetic tape before the cutting out. The same applies to the longitudinal direction.

A protective film was formed on the surface of the magnetic layer of the cut-out sample by the following method to obtain a sample including a protective film.

A carbon film (thickness of 80 nm) was formed on the surface of the magnetic layer of the sample by vacuum deposition, and a platinum (Pt) film (thickness of 30 nm) was formed on the surface of the formed carbon film by sputtering. The vacuum deposition of the carbon film and the sputtering of the platinum film were respectively performed under the following conditions.

Vacuum Deposition Conditions of Carbon Film

Deposition source: carbon (core of a mechanical pencil having a diameter of 0.5 mm)

Degree of vacuum in a chamber of a vacuum deposition device: equal to or smaller than $2 \times 10^{-3}$ Pa Current value: 16 A Sputtering Conditions of Platinum Film Target: Pt Degree of vacuum in a chamber of a sputtering device: equal to or smaller than 7 Pa Current value: 15 mA (ii) Manufacturing Cross Section Observation Sample A sample having a thin film shape was cut out from the sample including a protective film manufactured in the section (i), by FIB processing using a gallium ion (Ga$^+$) beam. The cutting out was performed by performing the following FIB processing two times. An acceleration voltage of the FIB processing was 30 kV.

In a first FIB processing, one end portion (that is, portion including one side surface of the sample including a protective film in the width direction) of the sample including a protective film in the longitudinal direction, including the area from the surface of the protective film to a region of a depth of approximately 5 μm was cut. The cut-out sample includes the area from the protective film to a part of the non-magnetic support.

Then, a microprobe was loaded on a cut-out surface side (that is, sample cross section side exposed by the cutting out) of the cut-out sample and the second FIB processing was performed. In the second FIB processing, the surface side opposite to the cut-out surface side (that is, one side surface in the width direction) was irradiated with a gallium ion beam to perform the cutting out of the sample. The sample was fixed by bonding the cut-out surface of the second FIB processing to the end surface of the mesh for STEM observation. After the fixation, the microprobe was removed.

In addition, the surface of the sample fixed to the mesh, from which the microprobe is removed, was irradiated with a gallium ion beam at the same acceleration voltage described above, to perform the FIB processing, and the sample fixed to the mesh was further thinned.

The cross section observation sample fixed to the mesh manufactured as described above was observed by a scanning transmission electron microscope, and the cos θ was acquired by the method described above. The cos θ acquired as described above is shown in Table 1.

(3) Evaluation of Squareness Ratio (SQ)

The squareness ratio of the manufactured magnetic tape was measured at a magnetic field strength of 1194 kA/m(15 kOe) by using an oscillation sample type magnetic-flux meter (manufactured by Toei Industry Co., Ltd.).

3. Measurement of Resistance Value of Servo Head

The servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as a value shown in Table 1. The servo head was moved in a width direction of the magnetic tape by 2.5 μm for 1 pass, a resistance value (electric resistance) of the reproducing head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 1.

Examples 2 to 8 and Comparative Examples 1 to 16

1. Manufacturing of Magnetic Tape

A magnetic tape was manufactured in the same manner as in Example 1, except that various conditions shown in Table 1 were changed as shown in Table 1.

2. Evaluation of Physical Properties of Magnetic Tape

Various physical properties of the manufactured magnetic tape were evaluated in the same manner as in Example 1.

3. Measurement of Resistance Value of Servo Head

A resistance value of the servo head was measured by the same method as that in Example 1, by using the manufactured magnetic tape. The magnetic tape transportation speed was set as a value shown in Table 1. In Examples 2 to 8 and Comparative Examples 7 to 16, the TMR head which was the same as that in Example 1 was used as a servo head. In Comparative Examples 1 to 6, a commercially available spin valve type GMR head (element width of 70 nm) was used as a servo head. This GMR head was a magnetic head having a CIP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results described above are shown in Table 1. In Table 1, the "compound 1" is a compound 1 disclosed in Table 1 of JP2016-177851A. In Table 1, the "compound 2" is a compound 2 disclosed in Table 1 of JP2016-177851A. In Comparative Example 14, 2,3-dihydroxynaphthalene was used instead of the compound 1 or 2. 2,3-dihydroxynaphthalene is a compound used as an additive for adjusting a squareness ratio in JP2012-203955A.

TABLE 1

|  |  | Example 1 | Example 2 | Example 3 | Example 4 | Example 5 | Example 6 | Example 7 | Example 8 |
|---|---|---|---|---|---|---|---|---|---|
| Magnetic layer thickness | | 0.1 μm | 0.1 μm | 0.1 μm | 0.1 μm | 0.1 μm | 0.1 μm | 0.1 μm | 0.1 μm |
| Non-magnetic layer thickness | | 1.5 μm | 1.0 μm | 1.0 μm | 0.5 μm | 0.5 μm | 0.3 μm | 0.3 μm | 0.3 μm |
| Total thickness of magnetic layer + non-magnetic layer | | 1.6 μm | 1.1 μm | 1.1 μm | 0.6 μm | 0.6 μm | 0.4 μm | 0.4 μm | 0.4 μm |
| Colloidal silica average particle size | | 120 nm | 80 nm | 80 nm | 80 nm | 80 nm | 40 nm | 40 nm | 40 nm |
| Calender temperature | | 80° C. | 90° C. | 90° C. | 90° C. | 90° C. | 110° C. | 110° C. | 110° C. |
| Center line average surface roughness Ra | | 2.8 nm | 2.0 nm | 2.0 nm | 2.0 nm | 2.0 nm | 1.5 nm | 1.5 nm | 1.5 nm |
| Dispersing agent | Kind | Compound 1 | Compound 1 | Compound 2 | Compound 2 | Compound 1 | Compound 1 | Compound 1 | Compound 1 |
|  | Component/part | 6.0 | 6.0 | 8.0 | 8.0 | 10.0 | 10.0 | 10.0 | 10.0 |
| Magnetic solution beads dispersion conditions (first stage) | Dispersion time/h | 10 | 10 | 10 | 10 | 10 | 10 | 10 | 10 |
|  | Bead diameter/mm | 0.5 | 0.5 | 0.5 | 0.5 | 0.5 | 0.5 | 0.5 | 0.5 |
| Magnetic solution beads dispersion conditions (second stage) | Dispersion time/h | 10 | 10 | 10 | 10 | 30 | 30 | 30 | 30 |
|  | Bead diameter/mm | 0.1 | 0.1 | 0.1 | 0.1 | 0.1 | 0.1 | 0.1 | 0.1 |
| Homeotropic alignment | | Performed | Performed | Performed | Performed | Performed | Performed | Performed | Performed |
| SQ | | 0.73 | 0.73 | 0.74 | 0.74 | 0.74 | 0.74 | 0.74 | 0.74 |
| cos θ | | 0.87 | 0.87 | 0.91 | 0.91 | 0.95 | 0.95 | 0.95 | 0.95 |
| Servo head | | TMR | TMR | TMR | TMR | TMR | TMR | TMR | TMR |
| Magnetic tape transportation speed | | 18 m/sec | 18 m/sec | 18 m/sec | 18 m/sec | 18 m/sec | 18 m/sec | 10 m/sec | 1 m/sec |
| Number of times of occurrence of decrease in resistance value (times) | | 0 | 0 | 0 | 0 | 0 | 0 | 0 | 0 |
| Rate of decrease in resistance value (%) | | 5 | 7 | 4 | 10 | 3 | 3 | 5 | 18 |

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Magnetic layer thickness | | 0.1 μm | 0.1 μm | 0.1 μm | 0.1 μm | 0.1 μm | 0.1 μm | 0.1 μm | 0.1 μm |
| Non-magnetic layer thickness | | 1.5 μm | 1.0 μm | 1.0 μm | 0.5 μm | 0.5 μm | 0.5 μm | 1.5 μm | 1.5 μm |
| Total thickness of magnetic layer + non-magnetic layer | | 1.6 μm | 1.1 μm | 1.1 μm | 0.6 μm | 0.6 μm | 0.6 μm | 1.6 μm | 1.6 μm |
| Colloidal silica average particle size | | 120 nm | 120 nm | 80 nm | 80 nm | 80 nm | 80 nm | 120 nm | 120 nm |
| Calender temperature | | 80° C. | 90° C. | 90° C. | 80° C. | 90° C. | 90° C. | 80° C. | 80° C. |
| Center line average surface roughness Ra | | 2.8 nm | 2.5 nm | 2.0 nm | 2.5 nm | 2.0 nm | 2.0 nm | 2.8 nm | 2.8 nm |

TABLE 1-continued

|  |  |  |  |  |  |  |  |  |  |
|---|---|---|---|---|---|---|---|---|---|
| Dispersing agent | Kind | — | — | — | — | — | — | — | — |
|  | Component/part | — | — | — | — | — | — | — | — |
| Magnetic solution beads dispersion conditions (first stage) | Dispersion time/h | 10 | 10 | 10 | 10 | 10 | 10 | 10 | 10 |
|  | Bead diameter/mm | 0.5 | 0.5 | 0.5 | 0.5 | 0.5 | 0.5 | 0.5 | 0.5 |
| Magnetic solution beads dispersion conditions (second stage) | Dispersion time/h | — | — | — | — | — | — | — | — |
|  | Bead diameter/mm | — | — | — | — | — | — | — | — |
| Homeotropic alignment |  | Not performed | Not performed | Not performed | Not performed | Not performed | Not performed | Not performed | Not performed |
| SQ |  | 0.58 | 0.58 | 0.58 | 0.58 | 0.58 | 0.58 | 0.58 | 0.58 |
| cos θ |  | 0.68 | 0.68 | 0.68 | 0.68 | 0.68 | 0.68 | 0.68 | 0.68 |
| Servo head |  | GMR | GMR | GMR | GMR | GMR | GMR | TMR | TMR |
| Magnetic tape transportation speed |  | 18 m/sec | 18 m/sec | 18 m/sec | 18 m/sec | 18 m/sec | 1 m/sec | 19 m/sec | 18 m/sec |
| Number of times of occurrence of decrease in resistance value (times) |  | 0 | 0 | 0 | 0 | 0 | 0 | 0 | 1 |
| Rate of decrease in resistance value (%) |  | 0 | 0 | 0 | 0 | 0 | 0 | 0 | — |

|  |  | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|
| Magnetic layer thickness |  | 0.1 μm | 0.1 μm | 0.1 μm | 0.1 μm | 0.1 μm | 0.1 μm | 0.1 μm | 0.1 μm |
| Non-magnetic layer thickness |  | 1.0 μm | 1.0 μm | 0.5 μm | 0.5 μm | 0.3 μm | 1.0 μm | 1.0 μm | 0.5 μm |
| Total thickness of magnetic layer + non-magnetic layer |  | 1.1 μm | 1.1 μm | 0.6 μm | 0.6 μm | 0.4 μm | 1.1 μm | 1.1 μm | 0.6 μm |
| Colloidal silica average particle size |  | 120 nm | 80 nm | 80 nm | 80 nm | 40 nm | 80 nm | 80 nm | 80 nm |
| Calender temperature |  | 90° C. | 90° C. | 80° C. | 90° C. | 110° C. | 90° C. | 90° C. | 90° C. |
| Center line average surface roughness Ra |  | 2.5 nm | 2.0 nm | 2.5 nm | 2.0 nm | 1.5 nm | 2.0 nm | 2.0 nm | 2.0 nm |
| Dispersing agent | Kind | — | — | — | — | — | 2,3-Dihydroxynaphthalene | Compound 1 | Compound 1 |
|  | Component/part | — | — | — | — | — | 12.0 | 12.0 | 12.0 |
| Magnetic solution beads dispersion conditions (first stage) | Dispersion time/h | 10 | 10 | 10 | 10 | 10 | 10 | 10 | 10 |
|  | Bead diameter/mm | 0.5 | 0.5 | 0.5 | 0.5 | 0.5 | 0.5 | 0.5 | 0.5 |
| Magnetic solution beads dispersion conditions (second stage) | Dispersion time/h | — | — | — | — | — | 10 | 30 | 30 |
|  | Bead diameter/mm | — | — | — | — | — | 0.1 | 0.1 | 0.1 |
| Homeotropic alignment |  | Not performed | Not performed | Not performed | Not performed | Not performed | Performed | Performed | Performed |
| SQ |  | 0.58 | 0.58 | 0.58 | 0.58 | 0.58 | 0.78 | 0.74 | 0.74 |
| cos θ |  | 0.68 | 0.68 | 0.68 | 0.68 | 0.68 | 0.80 | 0.96 | 0.96 |
| Servo head |  | TMR | TMR | TMR | TMR | TMR | TMR | TMR | TMR |
| Magnetic tape transportation speed |  | 18 m/sec | 18 m/sec | 18 m/sec | 18 m/sec | 18 m/sec | 18 m/sec | 18 m/sec | 18 m/sec |
| Number of times of occurrence of decrease in resistance value (times) |  | 3 | 7 | 9 | 10 | 10 | 6 | 1 | 1 |
| Rate of decrease in resistance value (%) |  | — | — | — | — | — | — | — | — |

As shown in Table 1, in Comparative Examples 1 to 6 in which the GMR head was used as a servo head, the magnetic tape transportation speed was equal to or lower than 18 m/sec and, even in a case where the cos θ of the magnetic tape was not 0.85 to 0.95, a significant decrease in resistance value of the servo head was not observed. In addition, in Comparative Example 7 in which the magnetic tape transportation speed exceeded 18 m/sec although the TMR head was used as a servo head, even in a case where the cos θ of the magnetic tape was not 0.85 to 0.95, a significant decrease in resistance value of the servo head was not observed. On the other hand, in Comparative Examples 8 to 16 in which the TMR head was used as a servo head, the magnetic tape transportation speed was equal to or lower than 18 m/sec, and the cos θ of the magnetic tape was not 0.85 to 0.95, a significant decrease in resistance value of the servo head occurred.

With respect to this, in Examples 1 to 8 in which the TMR head was used as a servo head, the magnetic tape transportation speed was equal to or lower than 18 m/sec, and the cos θ of the magnetic tape was 0.85 to 0.95, it was possible to prevent a significant decrease in resistance value of the servo head.

In addition, from the results shown in Table 1, it is also possible to confirm that a correlation between a decrease in resistance value of the TMR head and the squareness ratio is not observed.

One aspect of the invention is effective for usage of magnetic recording for which high-sensitivity reproducing of information recorded with high density is desired.

What is claimed is:

1. A magnetic tape device comprising:
a magnetic tape; and
a servo head,
wherein a magnetic tape transportation speed of the magnetic tape device is equal to or lower than 18 m/sec,
the servo head is a magnetic head including a tunnel magnetoresistance effect type element as a servo pattern reading element,
the magnetic tape includes a non-magnetic support, and a magnetic layer including ferromagnetic hexagonal ferrite powder, non-magnetic powder, and a binding agent on the non-magnetic support,
the magnetic layer includes a servo pattern, and
a tilt cos θ of the ferromagnetic hexagonal ferrite powder with respect to a surface of the magnetic layer acquired by cross section observation performed by using a scanning transmission electron microscope is 0.85 to 0.95.

2. The magnetic tape device according to claim 1, wherein the cos θ is 0.87 to 0.95.

3. The magnetic tape device according to claim 1, wherein a center line average surface roughness Ra measured regarding a surface of the magnetic layer is equal to or smaller than 2.8 nm.

4. The magnetic tape device according to claim 3, wherein the center line average surface roughness Ra is equal to or smaller than 2.5 nm.

5. The magnetic tape device according to claim 1, wherein the magnetic tape includes a non-magnetic layer including non-magnetic powder and a binding agent between the non-magnetic support and the magnetic layer, and
a total thickness of the magnetic layer and the non-magnetic layer is equal to or smaller than 1.8 μm.

6. The magnetic tape device according to claim 5, wherein the total thickness of the magnetic layer and the non-magnetic layer is equal to or smaller than 1.1 μm.

7. A head tracking servo method comprising:
reading a servo pattern of a magnetic layer of a magnetic tape by a servo head in a magnetic tape device,
wherein a magnetic tape transportation speed of the magnetic tape device is equal to or lower than 18 m/sec,
the servo head is a magnetic head including a tunnel magnetoresistance effect type element as a servo pattern reading element,
the magnetic tape includes a non-magnetic support, and a magnetic layer including ferromagnetic hexagonal ferrite powder, non-magnetic powder, and a binding agent on the non-magnetic support,
the magnetic layer includes the servo pattern, and
a tilt cos θ of the ferromagnetic hexagonal ferrite powder with respect to a surface of the magnetic layer acquired by cross section observation performed by using a scanning transmission electron microscope is 0.85 to 0.95.

8. The head tracking servo method according to claim 7, wherein the cos θ is 0.87 to 0.95.

9. The head tracking servo method according to claim 7, wherein a center line average surface roughness Ra measured regarding a surface of the magnetic layer is equal to or smaller than 2.8 nm.

10. The head tracking servo method according to claim 9, wherein the center line average surface roughness Ra is equal to or smaller than 2.5 nm.

11. The head tracking servo method according to claim 7, wherein the magnetic tape includes a non-magnetic layer including non-magnetic powder and a binding agent between the non-magnetic support and the magnetic layer, and
a total thickness of the magnetic layer and the non-magnetic layer is equal to or smaller than 1.8 μm.

12. The head tracking servo method according to claim 11, wherein the total thickness of the magnetic layer and the non-magnetic layer is equal to or smaller than 1.1 μm.

* * * * *